United States Patent

[11] 3,634,743

[72] Inventor Michael Joseph Ingenito
 Bronx, N.Y.
[21] Appl. No. 874,222
[22] Filed Nov. 5, 1969
[45] Patented Jan. 11, 1972
[73] Assignee General Time Corporation
 Stamford, Conn.

[54] ELECTROMECHANICAL OSCILLATOR FOR CONTROLLING A TIMING MOTOR
 12 Claims, 11 Drawing Figs.

[52] U.S. Cl. .................................................. 318/138,
 318/171, 318/254, 310/163, 310/268
[51] Int. Cl. .................................................. H02k 29/00
[50] Field of Search .......................................... 310/163,
 168, 268; 318/138, 171, 254

[56] References Cited
 UNITED STATES PATENTS

| | | | |
|---|---|---|---|
| 2,378,556 | 6/1945 | Jeffers ............................ | 310/163 |
| 2,994,023 | 7/1961 | Devol ............................ | 318/138 |
| 3,134,220 | 5/1964 | Meisner ......................... | 318/138 X |
| 3,149,274 | 9/1964 | Hetzel ........................... | 318/138 X |
| 3,250,066 | 5/1966 | Engelhardt et al. ............ | 318/138 |
| 3,351,834 | 11/1967 | Gerum .......................... | 318/138 X |

Primary Examiner—Gene Z. Rubinson
Attorney—Pennie, Edmonds, Morton, Taylor and Adams ABSTRACT: A timing device wherein an oscillator utilizing a mechanical resonator such as a tuning fork or a crystal is used to provide a nonsymmetrical output signal which drives a synchronous motor that is specifically designed to accommodate a nonsymmetrical drive signal. The motor is constructed so that the ratio of the width of the rotor teeth to the distance between the centers thereof is comparable to the duty cycle of the oscillator output signal. Accurate timekeeping over large variations in supply voltage and ambient temperature is accomplished by utilizing as the oscillator voltage source, the potential developed across a number of series connected, forward biased diodes and by utilizing two transistors such that variations in voltage with temperature are offset by the temperature variable junctions of the transistors.

INVENTOR
MICHAEL J. INGENITO
BY
Morgan, Finnegan, Durham & Pine
ATTORNEYS

INVENTOR.
MICHAEL J. INGENITO

BY

Morgan, Finnegan, Durham & Pine
ATTORNEYS

INVENTOR
MICHAEL J. INGENITO

ELECTROMECHANICAL OSCILLATOR FOR CONTROLLING A TIMING MOTOR

BACKGROUND OF THE INVENTION

This invention relates to a timing device, and more particularly to a battery-operated timepiece which employs a mechanical resonant member as the time keeping standard. Although reference will normally be made to a tuning fork as the mechanical resonant member, it should be understood that other such members, for example, a pendulum or a balance wheel, could be used.

Since the advent of the transistor, numerous battery-operated timepieces have been developed. They often embody a low-frequency transistor oscillator, the frequency of which is stabilized by a mechanical resonant member such as a tuning fork. In the commercially available units the rotary clock motion is usually derived through an escapement mechanism coupled to the resonant member.

An alternative approach is to develop the rotary motion through a synchronous electric motor rather than a mechanical escapement mechanism. Although the alternative approach has the potential advantage of providing a more accurate timepiece, since there is no significant loading adversely affecting the frequency of oscillation of the tuning fork, it is rarely seen embodied in commercial units. One reason is the present high cost of a synchronous motor as compared to the cost of an escapement mechanism. Another reason is the difficulty in matching a synchronous motor to the electric signal developed by the tuning fork oscillator, since the signal normally desired for efficient driving of a synchronous motor is not readily obtainable directly from a tuning fork oscillator and the signal normally available from the tuning fork oscillator is inefficient when applied to the normal synchronous motor.

An object of the invention is to provide a timing device where the loading of the mechanical resonant member, for example, a tuning fork, is minimized.

Another object of the invention is to provide a low-cost, motor-driven timing device with a highly accurate tuning fork as the time keeping standard.

Another object is to provide a timing device where a motor and tuning fork oscillator are designed so that they are highly compatible with one another.

A further object is to provide a timing device which keeps accurate time over an extremely wide range of temperature and supply voltages as may be encountered, for example, in automotive uses.

BRIEF SUMMARY OF THE INVENTION

The invention relates to a timing device wherein a tuning fork is used to control the frequency of an oscillator. The oscillator output signal is nonsymmetrical and drives a synchronous motor which has been designed specifically to accommodate a nonsymmetrical drive signal. The motor is constructed so that the ratio of the width of a rotor tooth to the distance between centers of rotor teeth is comparable to the duty cycle of the oscillator output signal.

In addition, the timing device is designed to provide accurate time keeping over large variations in supply voltage and ambient temperature. This is accomplished by utilizing as the oscillator voltage source the potential developed across series forward biased diodes and employing active circuit elements in such a manner that the variations of the voltage source with temperature are offset by the corresponding variations of the parameters of the active circuit elements.

BRIEF DESCRIPTION OF THE DRAWINGS

An illustrative embodiment is described in the following detailed specification which includes the drawings and wherein.

DETAILED DESCRIPTION

Figure 1:
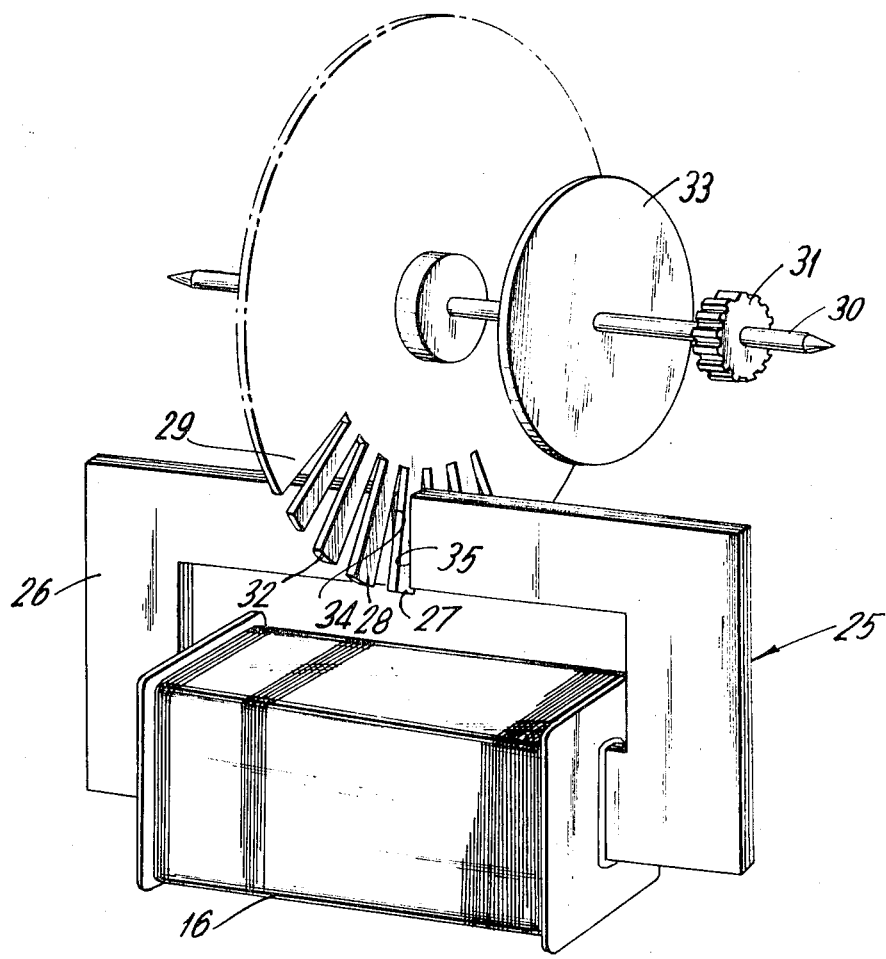
FIG. 1 is a perspective illustration of the synchronous motor.

The overall operation of the timing device will be described with respect to FIG. 3, with various aspects being set forth in greater detail in other drawings. The timing device consists basically of a tuning fork oscillator, a switching transistor and a synchronous motor. The oscillator utilizes an NPN-type transistor 1 as the active circuit element and includes pickup coil 12 and drive coil 10 which couple the oscillator circuit to the tuning fork 20 as shown in FIG. 2. The output of the oscillator is fed to an NPN-type switching transistor 2 which in turn controls the current flow through the stator coil 16 of motor 25 shown in FIG. 1.

The collector of transistor 1 is connected to the positive terminal of a battery 6 through a resistor 7 with the emitter thereof going to ground through resistors 8 and 9 and drive coil 10. The parallel combination of capacitor 11 and pickup coil 12 is connected between the junction of resistors 8 and 9 and the base of transistor 1 via a capacitor 13. The base of transistor 1 is connected to the positive source via a biasing resistor 14 and resistor 7.

Transistor 2 is a common emitter amplifier with the emitter connected directly to ground and the base connected to the emitter of transistor 1 via a base resistor 15. The collector of transistor 2 is tied to voltage source 6 via the parallel combination of diode 5 and motor coil 16.

Figure 3:
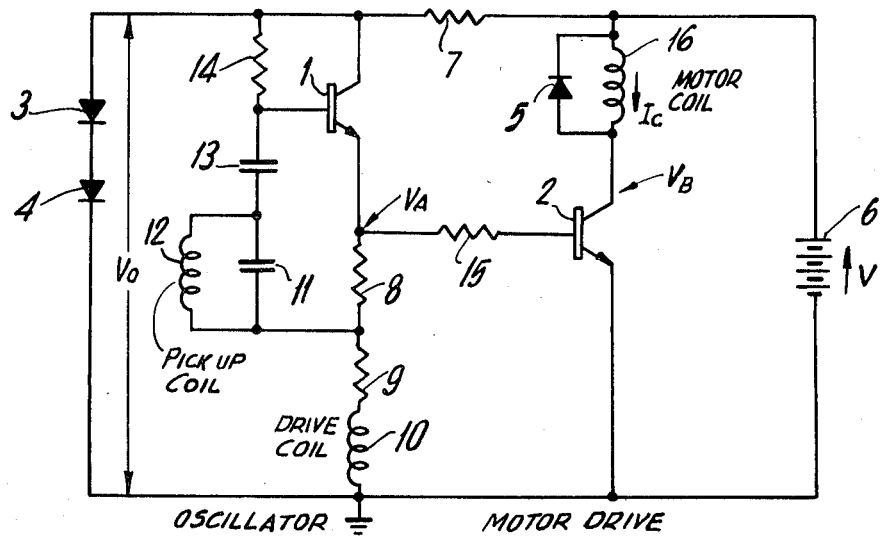
FIG. 3 is a schematic diagram illustrating an embodiment of the invention including a tuning fork oscillator coupled to a synchronous motor.

Typical component values for the circuit shown in FIG. 3 are:

| | |
|---|---|
| transistors 1 and 2 | 2N2925 |
| diodes 3, 4 and 5 | 1N462 |
| resistor 7 | 8200 ohms |
| resistor 8 | 22 ohms |
| resistor 9 | 680 ohms |
| capacitors 11 and 13 | 0.47 mfd. |
| resistor 14 | 150,000 ohms |
| resistor 15 | 1500 ohms. |

The tuning fork 20 shown in FIG. 2 is made from a generally flat strip of spring steel bent into a U-shaped configuration and thereafter heat treated. The tuning fork is mounted by means of feet 20a and 20b which are integrally joined to the tuning fork at the node point at the base of the U-shaped configuration. The tuning fork is dimensioned and tuned to oscillate at 300 Hertz, a frequency selected to eliminate tuning fork orientation and size problems likely to occur at lower frequencies.

Pickup coil 12 and drive coil 10 are concentrically wound about a permanent magnet core located between the tines of tuning fork 20. The airgap between the permanent magnet is minimized to reduce reluctance of the magnetic path but is sufficient to permit free movement of the tuning fork tines.

Assuming that voltage source 6 has just been applied to the circuit in FIG. 3, operation is as follows.

Current flows through resistor 14 and slightly forward biases the base-emitter junction of transistor 1. Since transistor 1 is used as an emitter follower, the emitter current is approximately $\beta$ times the base current, and a portion of that current flows through drive coil 10, thereby causing the tuning fork 20 (FIG. 2) to move. The motion of tuning fork 20 induces a voltage in pickup coil 12 which assists in forward biasing the base-emitter junction of transistor 1. The increased forward bias increases the current flow in the collector-emitter circuit through drive coil 10 and therefore the tuning fork continues to move until it reaches one extreme of its travel, at which point it changes direction. After tuning fork 20 has reversed its direction of motion, a voltage is induced in pickup coil 12 which causes the base of transistor 1 to be biased off. This condition remains until the tuning fork tines again change direction to thereby once again produce a signal in the pickup coil which forward biases transistor 1. Transistor 1 continues to be turned on and off in this fashion at a frequency determined by the mechanical resonant frequency of tuning fork 20.

Figure 3A:
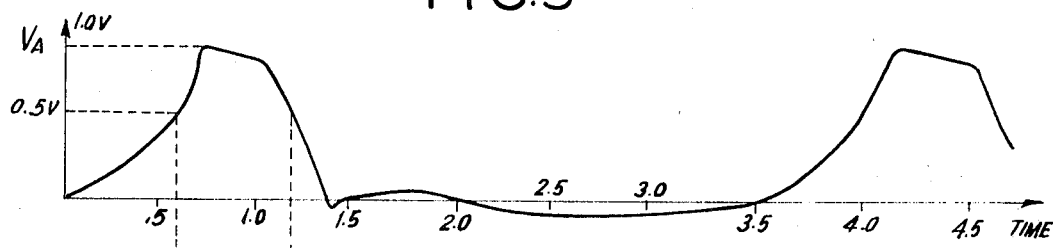
FIGS. 3a, 3b and 3c are curves showing the signals $V_A$, $V_B$ and $I_C$, respectively, as designated in FIG. 3.

Capacitor 13 provides DC isolation between the emitter and base of transistor 1. Capacitor 11 serves to tune the pickup coil 12 and increase the "on" time of transistor 1 and, hence, has a significant effect on the duty cycle of the oscillator. The oscillator output voltage $V_A$ is shown in FIG. 3a.

Tuning fork 20 is designed having a natural frequency of 300 Hz., thereby yielding a period of 3.333 milliseconds. As shown in FIG. 3a, the operating duty cycle of transistor 1 is such that the "on" time is relatively short as compared to the "off" time.

Figure 3B:
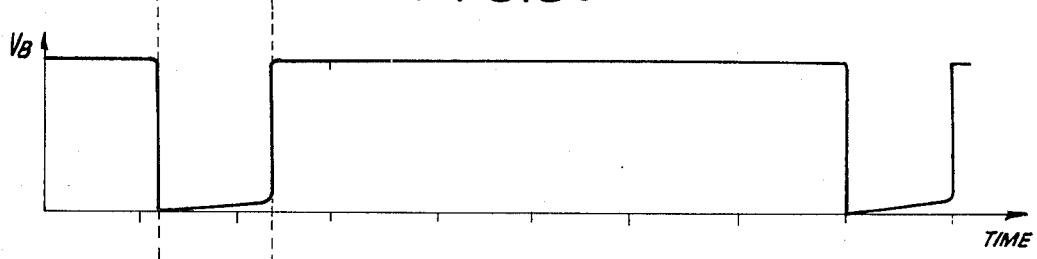

The voltage at the emitter of transistor 1 is used to provide the base drive for transistor 2. In order to forward bias the base-emitter junction of transistor 2, a voltage of about 0.5 volts must be attained. Therefore, transistor 2 has a shorter duty cycle than that of transistor 1. The potential $V_B$ appearing at the collector of transistor 2 is shown in FIG. 3b. Transistor 2 has a duty cycle of 1:6 and therefore the "on" time at 300 Hz. is approximately 0.55 milliseconds.

Figure 3C:
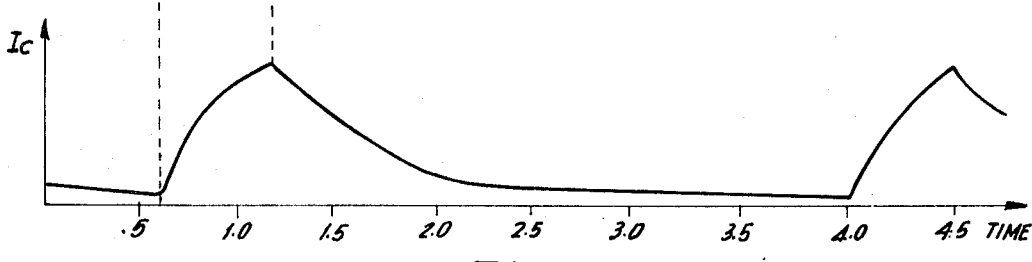

FIG. 3c illustrates the coil current flowing through motor coil 16. The coil current increases during the time transistor 2 conducts at a rate proportional to $(1-e^{-R_1/L_1 t})$, where L is the inductance of coil 16 and $R_1$ is the resistance of coil 16. After transistor 1 ceases to conduct, the energy stored in coil 16 is dissipated exponentially proportional to $(e^{-L/R_2 t})$, where L is the inductance of coil 16 and $R_2$ is the sum of the internal resistances of coil 16 and forward biased diode 5. The duty cycle of the coil current as shown in FIG. 3c is approximately 1:3 and therefore the "on" time of transistor 2 is approximately 1.1 milliseconds. The relation between the construction of synchronous motor 25 (FIGS. 1 and 1a) and the duty cycle of the current in the motor coil 16 (FIG. 3c) will be specifically set forth hereinafter.

To achieve accuracy irrespective of supply voltage and ambient temperature variations, resistor 7 is connected between the positive terminal of battery 6 and series diodes 3 and 4 which are connected across the oscillator. Diodes 3 and 4 establish a potential $V_o$ which is the operating potential for the oscillator circuit. Potential $V_o$ is the sum of the forward bias voltage drops of diodes 3 and 4 and is approximately 1.0–1.2 volts when silicon diodes are used. In an automobile, the battery potential is usually 6 or 12 volts and even under the worst condition rarely drops below 1.2 volts. The potential $V_o$ across the oscillator would therefore remain constant.

Diodes 3 and 4 are also part of a temperature compensation scheme. It is known that as temperature increases the forward bias voltage drop across diodes 3 and 4 will decrease, and therefore $V_o$ will decrease. This has the effect of reducing the amplitude of the oscillator output signal $V_A$ (FIG. 3a). It would be expected that this would result in a decrease in the conduction period of transistor 2 and a corresponding narrowing of the negative pulse portion of waveform $V_B$ at the collector of transistor 2 (FIG. 3b). However, this is not the case. Since transistor 2 is used as a common emitter amplifier, its base emitter threshold voltage decreases with increasing temperature, thereby maintaining the duty cycle of transistor 2 and the negative pulse portion of the waveform in FIG. 3b substantially constant. Thus, the duty cycle of the current in motor coil 16, shown in FIG. 3c, is also maintained substantially constant at about 1:3.

Figure 2:
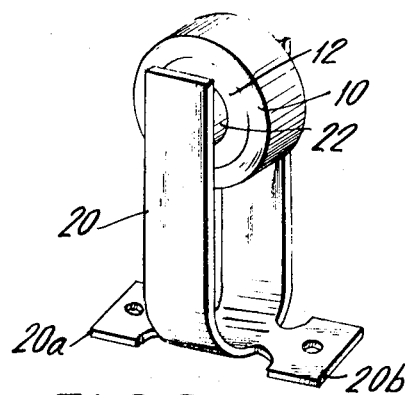
FIG. 2 is a perspective illustration of the tuning fork and associated drive and pickup coils.

FIG. 1 illustrates the synchronous motor 25 designed for compatibility with the tuning fork oscillator which produces an asynchronous output signal. The motor itself has a relatively low efficiency but when properly matched to the tuning fork oscillator produces sufficient torque for most clock applications. The motor can be inexpensively produced since it consists only of a simple stamped disc rotor, a coil and a simple core structure. While the motor is not self-starting, it is understood that any suitable means may be utilized to initiate motor movement. Thus, for example, the rotor shaft 30 may be manually rotated to start the motor.

Motor coil 16 is wound about a rectangular dielectric bobbin, using a relatively fine wire to produce a coil having a relatively high resistance on the order of 200 ohms to thereby minimize current flow through the coil. The stator 26 is of a generally rectangular configuration passing through the center of the coil bobbin. The stator is laminated and made from a suitable magnetic material. The stator is constructed to provide an airgap sufficient to accommodate the rotor between the pole faces 34 and 35.

Rotor 29 is a generally disc-shaped stamping having a configuration which provides 30 radially extending teeth 32. The rotor is made from a single sheet of magnetic material of standard sheet thickness on the order of 0.006 inch. The rotor disc is mounted on a shaft 30 along with an inertia wheel 33 and a drive gear 31 which can be part of the gear train in the clock movement. The shaft is mounted (mounting structure not shown) so that the teeth 32 freely pass through the airgap between pole faces 34 and 35.

Figure 1A:
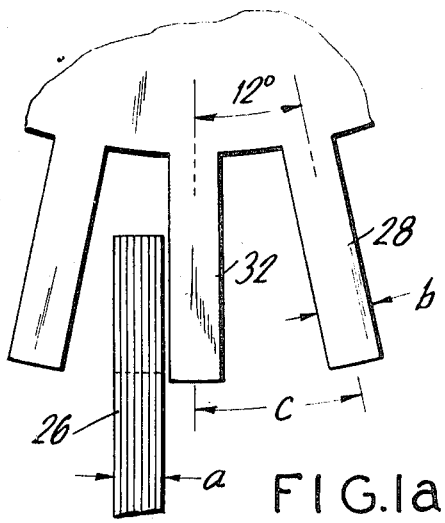
FIG. 1a is a detailed illustration of the rotor teeth and the stator poles.

As shown in FIG. 1a, the width a of the stator pole faces is equal to the width b of the rotor teeth 32. The width c between centers of adjacent teeth is three times the tooth width. The width a of stator 26 is 0.04 inch and is the same as the width of rotor tooth 32. The distance c between centerlines of adjacent teeth is approximately 0.12 inch, or three times the tooth width. The working area of the rotor, that is, the ratio of the active area of the rotor teeth as compared to the total rotor area passing through the airgap, is therefore approximately 1:3.

The working area of the rotor is approximately the same as the duty cycle of the energizing current applied to the motor winding to thereby match the motor to the oscillator.

The oscillator signal has a fundamental frequency of 300 Hertz and therefore when applied to a 30-tooth synchronous motor, the motor will rotate at 10 revolutions per second or 600 r.p.m. This means that a point on the circumference of rotor 29 which is 0.6 inch in diameter will move 0.04 inch in 1.1 milliseconds. If the current pulse (shown in FIG. 3c) is applied to motor coil 16 at a time when rotor tooth 32 is about to enter airgap 27, then the duration of the current pulse (1.1 milliseconds) corresponds to the length of time required for rotor tooth 32 to fully enter airgap 27. If the current pulse exists for longer than 1.1 milliseconds, it tends to exert a retarding force on the tooth as it attempts to leave airgap 27. However, by maintaining the duty cycle of the energizing signal applied to the motor approximately equal to the rotor working area ratio efficient operation can be achieved.

The illustrative embodiment just described is not exhaustive of the configurations which can utilize the invention disclosed herein. For example, a tuning fork having a fundamental frequency of oscillation of 600 Hz. could be employed in combination with an oscillator circuit designed to operate at a subharmonic of that fundamental frequency. Under such conditions, the duty cycle of the motor energizing signal would probably be less and, therefore, the working area ratio of the rotor would be modified accordingly.

The compatibility between the oscillator and the motor can also be achieved by adjusting the circuit parameters to provide a signal which matches the motor working area ratio. For example, the width of the current pulse is, in part, determined by the decay time constant in the loop including coil 16 and diode 5 and hence, by varying the resistance or inductance in this loop, the decay time can be varied as desired.

The width of the current pulse is also determined by the conduction interval of transistor 2 which in turn is controlled by the duty cycle of the oscillator output signal. The "on" time of the oscillator transistor can be varied through the design of the drive and pickup coils by varying the inductance of the coils and the turns ratio of the coils. The values of resistor 14 and capacitor 11 also affect the oscillator "on" time, but to a lesser degree.

Figure 4:
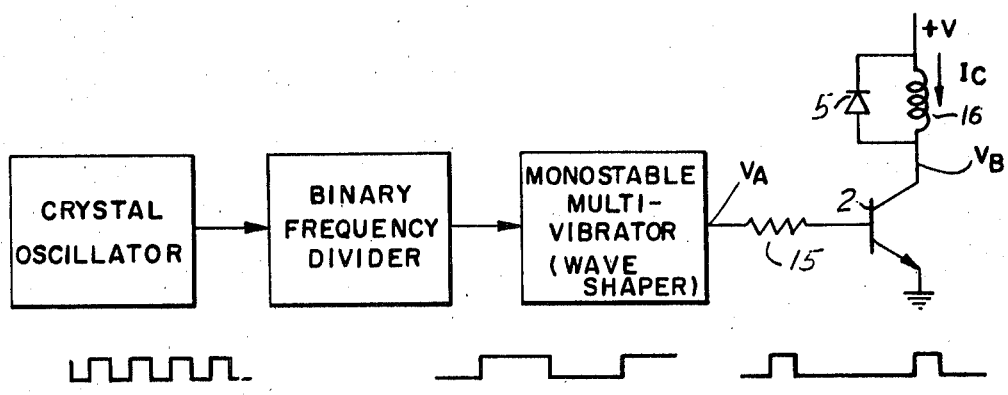
Figure 4A:
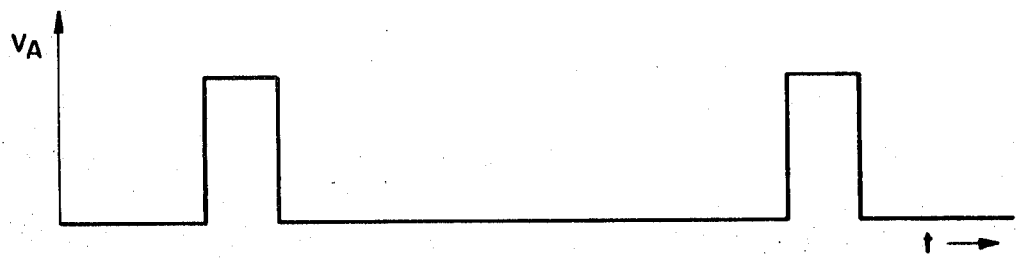
Figure 4B:
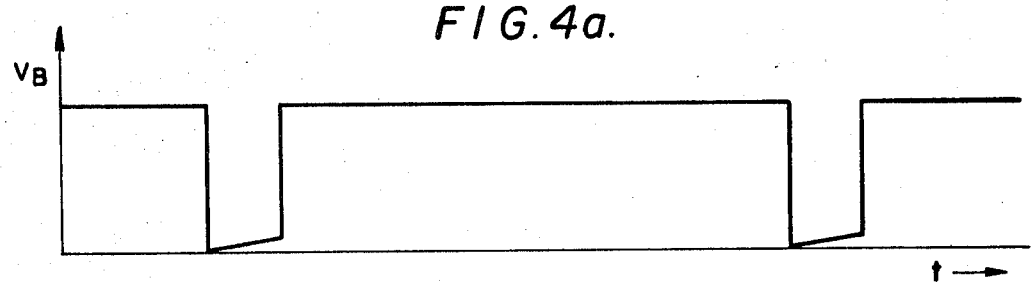
Figure 4C:
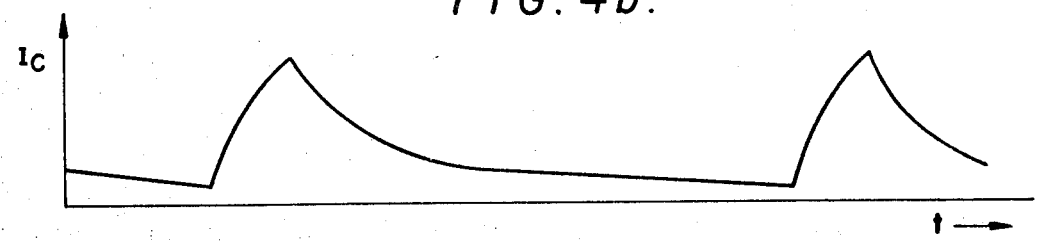

It should be noted that the invention may also be employed in a configuration such as shown in FIG. 4 wherein the mechanical resonant member, such as a crystal, has a high natural frequency of oscillation, provided that circuitry such as a binary frequency divider and wave shaper are employed to count down to a frequency compatible with clock motor operation and that the specified relation between the magnetic working area ratio of the rotor and the duty cycle of the ultimate drive signal is maintained. FIGS. 4a and 4b show the waveforms at the base and collector respectively of the transistor 2 and FIG. 4c shows the current waveform through coil 16. The voltage at the base of transistor 2 corresponds to the portion of the waveform of FIG. 3a situated between the dotted lines but does not have sloping leading and trailing edges as shown in FIG. 3a because of the wave shaper.

The invention is more particularly defined in the appended claims.

What is claimed is:

1. In a timing device the combination of:
   a mechanical resonant device;
   an oscillator circuit including said mechanical resonant device for providing an electric signal having a frequency controlled by the frequency of mechanical oscillation of said mechanical resonant device;
   means for providing said electrical signal with a selected duty cycle, said duty cycle being the ratio of time said signal is on per cycle;
   a motor including:
   a stator of magnetic material providing at least a pair of opposed pole faces with an airgap between;
   a stator winding magnetically coupled to said stator; and
   a rotor having a plurality of teeth of magnetic material adapted to rotate through said airgap, said rotor having a selected magnetic working area ratio defined by the ratio of the width of said teeth to the distance between the centers of said teeth,
   circuit means coupling said oscillator circuit to said stator winding to energize said winding with a current pulse energizing signal,
   having a frequency likewise controlled by said frequency of mechanical oscillation, and
   having a selected current pulse duty cycle wherein the magnetic working area ratio of said rotor is approximately the same as said selected current pulse duty cycle.

2. A timing device according to claim 1 wherein said mechanical resonant device is a tuning fork.

3. A timing device according to claim 1 wherein the width of said stator pole faces is substantially the same as the width of said rotor teeth.

4. A timing device according to claim 1 wherein said selected current pulse duty cycle and said rotor magnetic working area ratio are each approximately 1:3.

5. In a timing device the combination of:
   a mechanical resonant device;
   an oscillator circuit including said resonant device for providing an electrical output signal;
   said output signal having a predetermined frequency controlled by the frequency of mechanical oscillation of said resonant device, and
   said output signal having a selected duty cycle, said duty cycle being the ratio of the time said signal is on per cycle;
   a motor including:
   a stator of magnetic material providing at least a pair of opposed pole faces with an airgap therebetween;
   a stator winding magnetically coupled to said stator, and
   a rotor having a plurality of teeth of magnetic material adapted to rotate through said airgap, said rotor having a selected magnetic working area ratio defined by the ratio of the width of said teeth to the distance between the centers of said teeth;
   a source of electrical energy;
   circuit means coupled to said source and between said oscillator and said stator winding to energize said winding with successive current pulses at said predetermined frequency and at a selected current pulse duty cycle, each of said current pulses including:
   a first interval corresponding in time to the oscillator pulse width during which electrical energy is supplied to said winding from said source, and a second interval during which the current flow through said winding decays wherein said magnetic working area ratio of said rotor is substantially the same as said selected current duty cycle.

6. Timing apparatus according to claim 5 wherein said circuit means includes a unidirectional shunt path across said winding to form a closed circuit loop with said winding, the resistance and inductance in said loop being selected to control said second interval to achieve the desired current duty cycle.

7. Timing apparatus according to claim 5 wherein said mechanical resonant device is a tuning fork.

8. Timing apparatus according to claim 5 wherein said mechanical resonant device is a crystal.

9. In a timing device, the combination of:
   a mechanical resonant device;
   an oscillator circuit including said resonant device for providing an electrical output signal having a frequency controlled by the frequency of mechanical oscillation of said resonant device;
   a synchronous motor;
   a source of electrical energy;
   circuit means coupled to said source and between said oscillator and said motor for driving said motor; the improvement being means for preventing variations in said source of electrical energy from causing the amplitude of said electrical output signal of said oscillator circuit to also vary, said means including at least one forward-biased semiconductor junction connected across said oscillator circuit so as to provide a stable source of operating voltage for said oscillator circuit independent of said energy source variations.

10. A timing device according to claim 9 wherein said means for preventing amplitude variations includes:
    a forward-biased diode connected across said oscillator circuit, and
    resistive means connected between said diode and said energy source.

11. In a timing device, the combination of:
    a mechanical resonant device;
    an oscillator circuit including said resonant device for producing an electrical output signal
    having a frequency controlled by the frequency of mechanical oscillation of said resonant device, and
    including successive pulses;
    a synchronous motor;
    a source of electrical energy;
    circuit means coupled to said source and between said oscillator and said motor for driving said motor with successive current pulses at a selected current pulse duty cycle;
    the improvement being means for substantially preventing variations in the ambient temperature from altering said current pulse duty cycle,
    said means including at least one forward-biased semiconductor junction connected across said oscillator circuit so as to provide a source of operating voltage for said oscillator circuit, and
    semiconductor switch means included within said circuit means and connected between said oscillator circuit and said motor so that variations in the forward-biased semiconductor junction with temperature compensate for the variations of the parameters of said switch means with temperature.

12. A timing device according to claim 11 wherein:
    said semiconductor junction is a diode which is connected to said energy source through resistive means, and
    the semiconductor switch means is a transistor wherein the variation of the base-to-emitter voltage with temperature is the principal parameter compensated by said diode.